US012110015B2

(12) United States Patent
Varunjikar et al.

(10) Patent No.: US 12,110,015 B2
(45) Date of Patent: Oct. 8, 2024

(54) VEHICULAR DRIVING ASSISTANCE SYSTEM WITH LATERAL MOTION CONTROL

(71) Applicant: Magna Electronics Inc., Auburn Hills, MI (US)

(72) Inventors: Tejas Murlidhar Varunjikar, Troy, MI (US); Pushpendra Kushwaha, Uttar Pradesh (IN); Arpit Awathe, Auburn Hills, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 269 days.

(21) Appl. No.: 17/662,465

(22) Filed: May 9, 2022

(65) Prior Publication Data

US 2022/0363250 A1 Nov. 17, 2022

Related U.S. Application Data

(60) Provisional application No. 63/201,724, filed on May 11, 2021.

(51) Int. Cl.
*B60W 30/12* (2020.01)
*B60W 10/20* (2006.01)
(Continued)

(52) U.S. Cl.
CPC ............ *B60W 30/12* (2013.01); *B60W 10/20* (2013.01); *B60W 40/06* (2013.01);
(Continued)

(58) Field of Classification Search
CPC .................................................... B60W 30/12
See application file for complete search history.

(56) References Cited

U.S. PATENT DOCUMENTS

| 5,550,677 A | 8/1996 | Schofield et al. |
| 5,670,935 A | 9/1997 | Schofield et al. |

(Continued)

FOREIGN PATENT DOCUMENTS

EP  3360746 A1  8/2018

OTHER PUBLICATIONS

Snider J.M., "Automatic Steering Methods for Autonomous Automobile Path Tracking", Feb. 2009, CMU thesis.

(Continued)

*Primary Examiner* — Michael A Berns
(74) *Attorney, Agent, or Firm* — HONIGMAN LLP

(57) ABSTRACT

A vehicular driving assistance system includes a camera viewing exterior of a vehicle and capturing image data. The system, via processing captured image data as the vehicle travels along a current traffic lane, determines a current lateral position of the vehicle within the current traffic lane and determines a target lateral position of the vehicle within the current traffic lane. The system determines a steering command to guide the vehicle from the current lateral position to the target lateral position and determines a steering angle offset required to maintain the target lateral position within the current traffic lane and stores the determined steering angle offset in nonvolatile memory. After storing the determined steering angle offset and when the vehicle is traveling during a subsequent trip, the system determines a second target lateral position of the vehicle within the current traffic lane and applies the stored steering angle offset.

22 Claims, 3 Drawing Sheets

(51) Int. Cl.
  *B60W 40/06* (2012.01)
  *B60W 40/105* (2012.01)
  *B60W 50/00* (2006.01)
  *B62D 15/02* (2006.01)
  *G06V 20/56* (2022.01)

(52) U.S. Cl.
  CPC .......... *B60W 40/105* (2013.01); *B60W 50/00* (2013.01); *B62D 15/021* (2013.01); *G06V 20/588* (2022.01); *B60W 2050/0012* (2013.01); *B60W 2420/403* (2013.01); *B60W 2520/14* (2013.01); *B60W 2520/18* (2013.01); *B60W 2540/18* (2013.01); *B60W 2552/53* (2020.02); *B60W 2710/207* (2013.01)

(56) References Cited

U.S. PATENT DOCUMENTS

| | | | |
|---|---|---|---|
| 5,949,331 | A | 9/1999 | Schofield et al. |
| 6,580,986 | B1 | 6/2003 | Uenuma et al. |
| 6,690,268 | B2 | 2/2004 | Schofield et al. |
| 6,824,281 | B2 | 11/2004 | Schofield et al. |
| 6,882,287 | B2 | 4/2005 | Schofield |
| 7,038,577 | B2 | 5/2006 | Pawlicki et al. |
| 7,480,149 | B2 | 1/2009 | DeWard et al. |
| 7,720,580 | B2 | 5/2010 | Higgins-Luthman |
| 7,855,755 | B2 | 12/2010 | Weller et al. |
| 8,256,821 | B2 | 9/2012 | Lawlor et al. |
| 9,180,908 | B2 | 11/2015 | Van Dan Elzen et al. |
| 9,340,227 | B2 | 5/2016 | Bajpai |
| 9,487,159 | B2 | 11/2016 | Achenbach |
| 9,596,387 | B2 | 3/2017 | Achenbach et al. |
| 9,871,971 | B2 | 1/2018 | Wang et al. |
| 9,896,039 | B2 | 2/2018 | Achenbach et al. |
| 9,988,047 | B2 | 6/2018 | Johnson et al. |
| 10,032,369 | B2 | 7/2018 | Koravadi |
| 10,055,651 | B2 | 8/2018 | Chundrlik, Jr. et al. |
| 10,071,687 | B2 | 9/2018 | Ihlenburg et al. |
| 10,099,614 | B2 | 10/2018 | Diessner |
| 10,268,904 | B2 | 4/2019 | Gupta |
| 10,315,651 | B2 | 6/2019 | Fiaschetti et al. |
| 10,449,899 | B2 | 10/2019 | Gupta et al. |
| 10,571,923 | B2 * | 2/2020 | Tamboli ............... G05D 1/0088 |
| 11,014,569 | B2 * | 5/2021 | Ghasemalizadeh .. G05D 1/0088 |
| 11,345,400 | B2 * | 5/2022 | Funke ................... B62D 7/159 |
| 11,414,127 | B2 * | 8/2022 | Funke ................... B62D 6/001 |
| 11,685,431 | B2 * | 6/2023 | Al Assad ................ C09D 7/63 |
| | | | 701/41 |
| 2009/0295181 | A1 | 12/2009 | Lawlor et al. |
| 2011/0010054 | A1 | 1/2011 | Wilson-Jones et al. |
| 2014/0160284 | A1 | 6/2014 | Achenbach et al. |
| 2014/0226012 | A1 | 8/2014 | Achenbach |
| 2015/0015713 | A1 | 1/2015 | Wang et al. |
| 2015/0327398 | A1 | 11/2015 | Achenbach et al. |
| 2016/0159394 | A1 | 6/2016 | Ryu et al. |
| 2021/0263518 | A1 * | 8/2021 | Sheng ................... G06V 20/58 |
| 2022/0048504 | A1 | 2/2022 | Prasad Challa et al. |
| 2022/0048509 | A1 | 2/2022 | Prasad Challa |
| 2022/0048566 | A1 | 2/2022 | Prasad Challa et al. |
| 2022/0135030 | A1 * | 5/2022 | Varunjikar ............ B60W 30/10 |
| | | | 701/1 |
| 2022/0176960 | A1 | 6/2022 | Awathe et al. |
| 2022/0363250 | A1 * | 11/2022 | Varunjikar ........... G06V 20/588 |
| 2023/0134480 | A1 * | 5/2023 | Varunjikar ............. G06F 30/20 |
| | | | 701/41 |
| 2023/0415734 | A1 * | 12/2023 | Zhu ....................... G01S 13/931 |

OTHER PUBLICATIONS

Werling et al., Invariant Trajectory Tracking With a Full-Size Autonomous Road Vehicle, IEEE, vol. 26, No. 4, Aug. 2010.
Werling et al., Optimal trajectories for time-critical street scenarios using discretized terminal manifolds, The International Journal of Robotics Research, Mar. 2012.

* cited by examiner

VEHICULAR DRIVING ASSISTANCE SYSTEM WITH LATERAL MOTION CONTROL

CROSS REFERENCE TO RELATED APPLICATION

The present application claims the filing benefits of U.S. provisional application Ser. No. 63/201,724, filed May 11, 2021, which is hereby incorporated herein by reference in its entirety.

FIELD OF THE INVENTION

This disclosure relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

Implementations herein provide a driving assistance system or vision system or imaging system for a vehicle that utilizes one or more cameras (preferably one or more CMOS cameras) to capture image data representative of images exterior of the vehicle, and provides an electronic control unit (ECU) that includes electronic circuitry and associated software. The electronic circuitry of the ECU includes an image processor for processing image data captured by the camera to detect presence of objects in the field of view of the camera. The ECU, responsive to processing by the image processor of image data captured by the camera and as the vehicle travels along a current traffic lane, determines a current lateral position of the vehicle within the current traffic lane. The ECU, responsive to processing by the image processor of image data captured by the camera and as the vehicle travels along the current traffic lane, determines a desired or target lateral position of the vehicle within the current traffic lane. The ECU, responsive to determining the current lateral position of the vehicle and the target lateral position of the vehicle, determines a steering command to guide the vehicle from the current lateral position to the target lateral position. The ECU, responsive to guiding the vehicle to the target lateral position within the current traffic lane, determines a steering angle offset required to maintain the target lateral position within the current traffic lane and the ECU stores the determined steering angle offset in nonvolatile memory disposed at the vehicle. The ECU, after storing the determined steering angle offset and on a subsequent trip, determines a second target lateral position of the vehicle within the current traffic lane. The ECU, responsive to determining the second target lateral position of the vehicle, applies the stored steering angle offset to maintain the second target lateral position within the current traffic lane.

These and other objects, advantages, purposes and features of these implementations will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a display, such as a rearview display or a top down or bird's eye or surround view display or the like.

Figure 1:
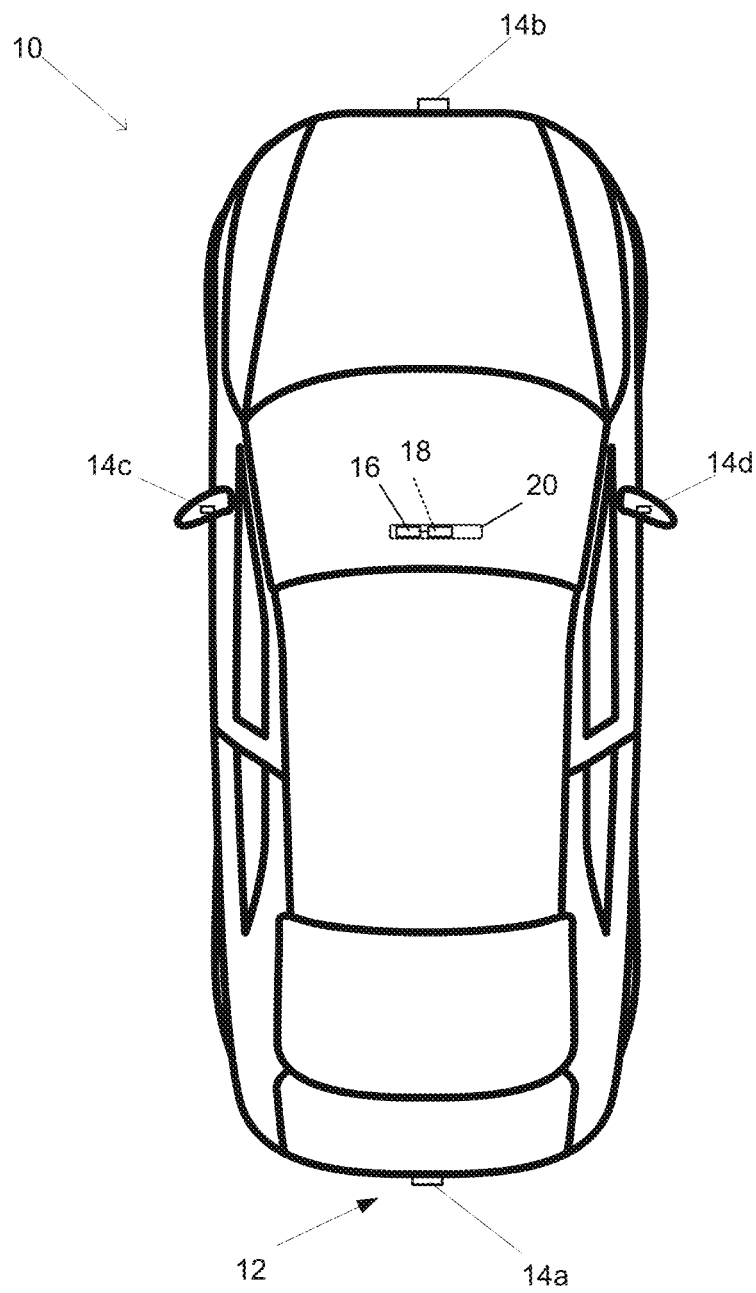
FIG. 1 is a plan view of a vehicle with a driver assistance system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Advanced driver assistance systems (ADAS) often obtain information of the surrounding environment through various sensors such as cameras, radar, LiDAR, etc. This information is used by various features (e.g. adaptive cruise control, lane centering, lane keeping assist, etc.) to assist the driver while driving or operating a vehicle. These features (like lane keeping assist or lane centering) often use data captured by the camera (e.g., lane-mark information) to control lateral motion of the vehicle.

For lateral control of the vehicle, the desired lateral position of the equipped vehicle within a traffic lane the vehicle is traveling along is calculated and compared against the actual position of the equipped vehicle in the lane. A lateral controller controls the lateral motion of the vehicle to minimize the error between the actual lateral position of the vehicle within the traffic lane and desired lateral position of the vehicle within the traffic lane. The output of the lateral controller is typically either steering angle or steering motor torque to a steering system of the vehicle (i.e., to cause the vehicle to move laterally within the lane to approach the desired lateral position).

There are several vehicle related phenomena that lead to a steering torque pull or steering angle bias while driving on a straight road. These phenomena include, for example, asymmetric tire alignment, steering column bias, road banking, tire wear, etc. Electric Power Steering (EPS) systems have methods to detect and compensate for torque pull experienced by the driver of a vehicle while doing manual operation of a motor vehicle. However, ADAS functions also need to calculate an angle and/or torque bias to send a compensated command to the EPS (i.e., compensate the angle and/or torque command for the bias).

Implementations herein include a vehicular driving assistance system that learns or determines the steering angle or torque offset (i.e., bias) present (if any) in the equipped vehicle so that an appropriate steering angle/torque compensation can be applied while performing a robust lateral motion control of the equipped vehicle. That is, the system may learn and remember the angle/torque offset in the steering system so that appropriate steering angle/torque that takes into account the offset can be generated for lateral control of the vehicle (i.e., left or right movement of the vehicle within the traffic lane or across traffic lanes). When active, the system attempts to minimize the error between the desired or target lateral position of the vehicle within the traffic lane the vehicle is traveling along and the actual lateral position of the vehicle within the traffic lane. The system includes a controller that may accumulate instantaneous error over time. If and when any steering angle and/or torque offset or bias is present in the steering system (e.g., from a misalignment of the vehicle), the controller requires additional time to accumulate the error and reach the desired value. Typically, when the system is activated, the accumulation of the error begins at zero (i.e., no bias or offset), thus the controller requires more time to reach the desired value. To reduce this additional time taken by the controller to achieve the desired value, the system learns the steering angle/torque offset.

The driver assistance system learns and stores the last valid accumulated error when the system was last active (e.g., from a previous trip using the vehicle or previous usage of the system during the same trip with the vehicle). For example, when the system is deactivated (via actuation of a user input, shutting the vehicle off, etc.), the system stores the most recent error accumulation in non-volatile storage or memory. Whenever the feature activates again (e.g., via actuation of a user input, starting the vehicle, etc.), the controller begins the accumulation of the error signal starting from the learned/stored value instead of starting from zero again. Thus, the controller can achieve the desired value in less time and ultimately decrease the response time of the system to achieve the desired lateral position within the traffic lane the equipped vehicle is travelling in.

Figure 2:
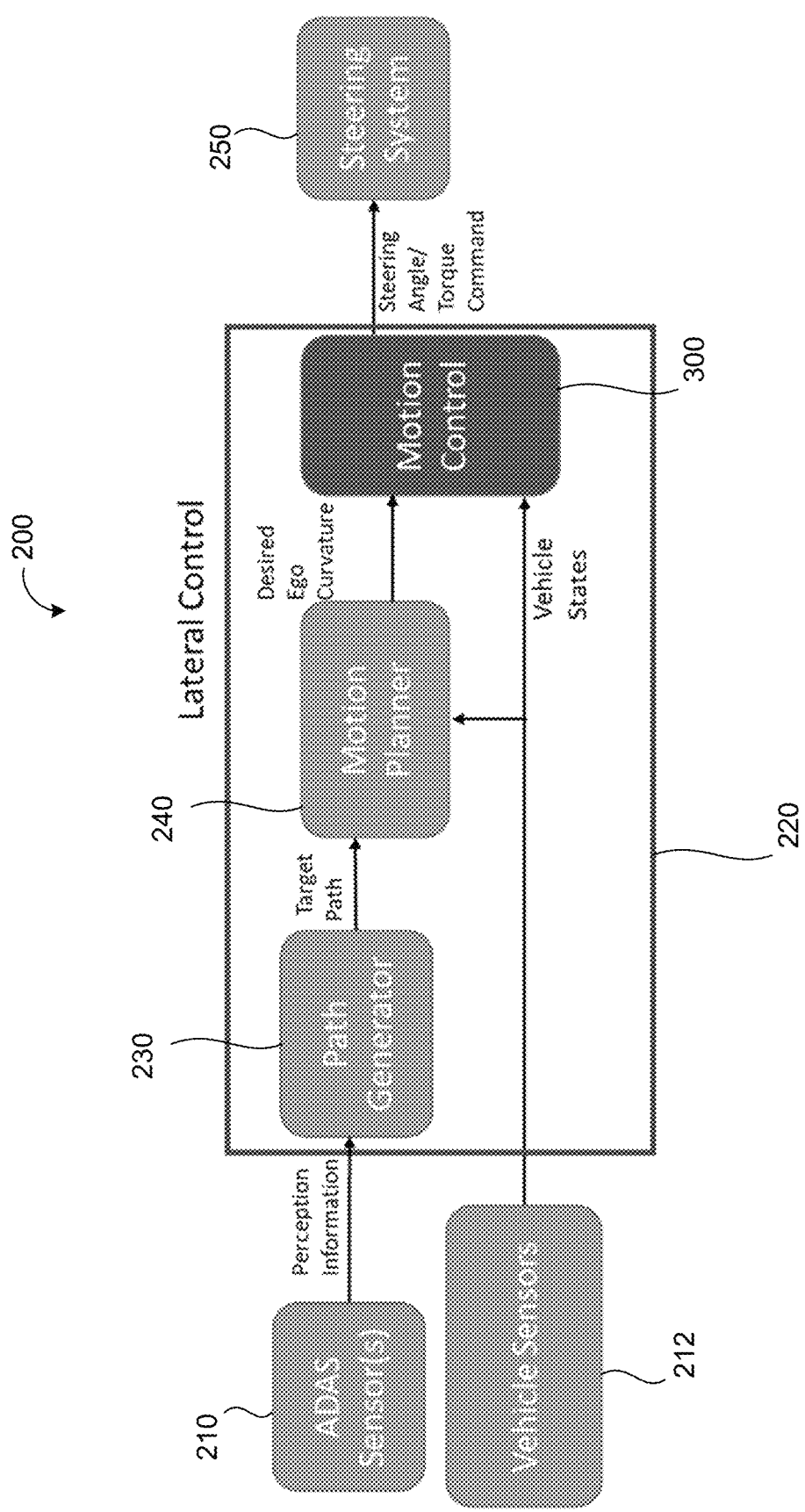
FIG. 2 is a block diagram of the driver assistance system of FIG. 1.

Referring now to FIG. 2, a block diagram 200 of the system includes a lateral controller 200. The lateral controller 200 receives sensor data from one or more ADAS sensors 210. These sensors sense the environment around the equipped vehicle and output perception information. For example, a front-viewing camera (e.g., such as camera 14b or a camera mounted to the interior of the windshield and viewing forward of the vehicle through the windshield) captures image data that includes lane marking information. Other vehicle sensors may capture GPS and/or map output waypoint information. The block diagram also includes vehicle sensors 212 that capture vehicle state information such as vehicle speed, yaw rate, acceleration, etc.

The system includes a lateral controller 220 or control portion with a path generator module 230, a motion planner module 240, and a motion control module 300. The path generator generates a target path along the current traffic lane for the equipped vehicle to follow. The motion planner calculates, based on the target path generated by the path generator, a desired curvature for the target path of the equipped vehicle. The motion control module uses the desired curvature calculated by the motion planner and current vehicle states (i.e., captured by the vehicle sensors), to generate a steering angle or torque command to guide the vehicle along the desired trajectory of the target path. The block diagram 200 also includes a steering system 250. The steering system includes both hardware and software that executes the steering torque or angle command generated by the motion control module in order to move the vehicle toward the desired path along the traffic lane.

Figure 3:
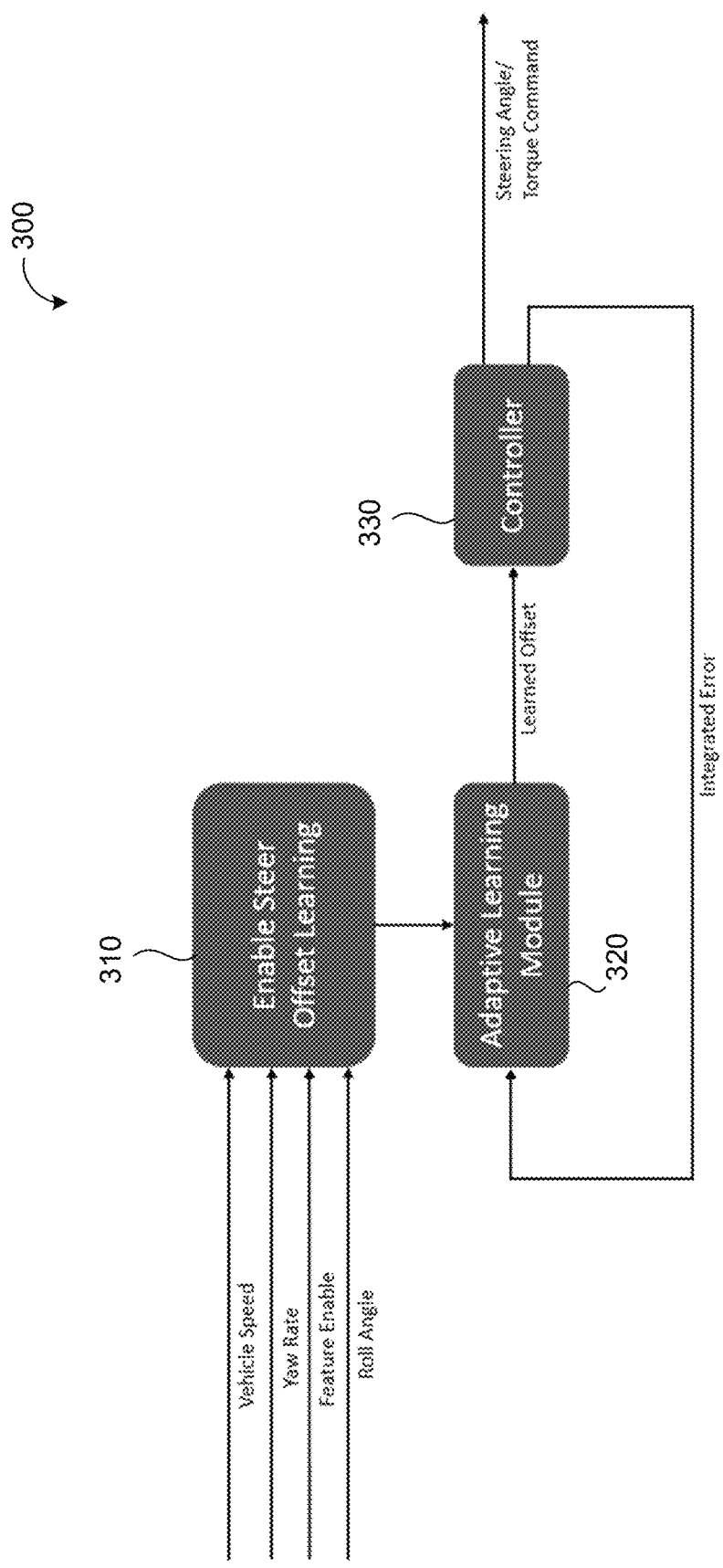
FIG. 3 is a block diagram of a motion control module of the driver assistance system of FIG. 1.

Referring now to FIG. 3, optionally, the motion control module 300 may include an enable steer offset learning module 310, an adaptive learning module 320, and a motion controller 330. The enable steer offset learning module determines when to learn the steer offset or bias value. The enable offset learning module receives a number of inputs that may include one or more of the vehicle speed, the yaw rate of the vehicle, whether the system is currently enabled or disabled, and a roll angle of the vehicle (e.g., via one or more vehicle sensors). The system may only learn the steer offset. For example, the module may determine whether the current speed of the vehicle is greater than a defined threshold and only learn the offset when the speed is above the threshold. Additionally or alternatively, the module may determine whether the current yaw of the vehicle is less than a defined threshold. Optionally, the module may only permit learning when the system has been enabled for a threshold period of time. Optionally, the module may determine whether the current roll angle of the vehicle is less than a defined threshold. When each of the criteria required by the enable steer offset learning are satisfied (e.g., the vehicle is traveling above a threshold speed and/or with a less than threshold yaw rate and/or less than threshold yaw rate and/or the system has been enabled for a threshold period of time), the module may enable the adaptive learning module.

The adaptive learning module receives the integrated error from the controller and filters large transients (e.g., sudden jumps) in error values to learn the steering and/or torque command. The controller, based on error between the desired and actual curvature of the path of the vehicle (e.g., determined during execution of a steering command and/or after execution of a steering command), attempts to achieve and maintain the desired steering angle/torque that best allows the vehicle to follow the desired path along the traffic lane. Optionally, the controller is a feedforward and integrator type controller although other equivalent controllers can be used as well. For example, the controller may be a feedforward and proportional-integral-derivative (PID) controller, a sliding mode controller, etc. When an integrator is used and the vehicle is in a steady-state condition, the output of integrator typically corresponds to an additional steering command to compensate for the offset in steering angle or torque.

Thus, the vehicular driving assistance system includes an ADAS lateral control system that uses ADAS sensors to control lateral motion of the vehicle by sending a steering command to the steering system. The ADAS lateral control system includes one or more of a path generator module, a motion planner module, and a motion control module. The motion control module includes an adaptive learning module that learns and updates the steering command offset and saves the learned steering command offset when vehicle power is off or the system is disabled. The motion control module also includes an enable steer offset learning module that enables offset learning based on various conditions such as when the vehicle speed is greater than a defined threshold, the vehicle yaw rate is less than a defined threshold, the lateral feature system is enabled for a certain period, and/or the vehicle roll angle is less than a defined threshold. The motion control module also includes a controller that calculates a steering command to control lateral motion of the vehicle and applies the learned steering command offset while calculating the steering command. The controller applies the learned steering command offset when initializing the integrator. The learned value can be saved in a nonvolatile memory disposed at the vehicle and can subsequently retrieved and provided to the controller whenever the vehicle powers on or when the ADAS system is enabled.

The vehicular control system may utilize aspects of the systems described in U.S. Pat. Nos. 10,315,651; 9,340,227; 9,180,908 and/or 6,882,287, and/or U.S. patent applications, Ser. No. 17/452,419, filed Oct. 27, 2021), Ser. No. 17/457, 767, filed Dec. 6, 2021, Ser. No. 17/445,198, filed Aug. 17, 2021, Ser. No. 17/445,199, filed Aug. 17, 2021, and/or Ser. No. 17/445,200, filed Aug. 17, 2021, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. No. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least one million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of these implementations, which is intended to be limited only by the scope of the appended claims, as interpreted according to the principles of patent law including the doctrine of equivalents.

The invention claimed is:

1. A vehicular driving assistance system, the vehicular driving assistance system comprising:
a camera disposed at a vehicle equipped with the vehicular driving assistance system and viewing exterior of the vehicle, the camera capturing image data;
wherein the camera comprises a CMOS imaging array, and wherein the CMOS imaging array comprises at least one million photosensors arranged in rows and columns;
an electronic control unit (ECU) comprising electronic circuitry and associated software;
wherein the electronic circuitry of the ECU comprises an image processor for processing image data captured by the camera;
wherein the vehicular driving assistance system, via processing at the ECU of image data captured by the camera as the vehicle travels along a first traffic lane of a road, determines a first target lateral position of the vehicle within the first traffic lane;
wherein the vehicular driving assistance system, responsive to determining the first target lateral position for the vehicle within the first traffic lane, determines a first steering command to position the vehicle at the first target lateral position within the first traffic lane as the vehicle travels along the first traffic lane;
wherein the vehicular driving assistance system, after beginning execution of the first steering command to maneuver the vehicle toward the first target lateral position, determines a steering angle offset that comprises an amount of error of the first steering command;
wherein the vehicular driving assistance system stores the determined steering angle offset in nonvolatile memory disposed at the vehicle;
wherein the vehicular driving assistance system, after storing the determined steering angle offset and when the vehicle is traveling along a second traffic lane, determines a second target lateral position for the vehicle within the second traffic lane;
wherein the vehicular driving assistance system, responsive to determining the second target lateral position for the vehicle within the second traffic lane, determines a second steering command to position the vehicle at the second target lateral position within the second traffic lane as the vehicle travels along the second traffic lane; and
wherein the vehicular driving assistance system, responsive to determining the second target lateral position of the vehicle within the second traffic lane, applies the stored determined steering angle offset to the second steering command to position the vehicle at the second target lateral position within the second traffic lane as the vehicle travels along the second traffic lane.

2. The vehicular driving assistance system of claim 1, wherein the first traffic lane is different from the second traffic lane.

3. The vehicular driving assistance system of claim 1, wherein the second traffic lane is the same traffic lane as the first traffic lane, and wherein the vehicle travels along the second traffic lane during a subsequent trip after travelling along the first traffic lane.

4. The vehicular driving assistance system of claim 1, wherein the vehicular driving assistance system determines the steering angle offset when a current speed of the vehicle exceeds a threshold speed.

5. The vehicular driving assistance system of claim 1, wherein the vehicular driving assistance system determines the steering angle offset when a current yaw rate of the vehicle is below a threshold yaw rate.

6. The vehicular driving assistance system of claim 1, wherein the vehicular driving assistance system determines the steering angle offset when a current roll angle of the vehicle is below a threshold roll angle.

7. The vehicular driving assistance system of claim 1, wherein the vehicular driving assistance system determines the steering angle offset when the vehicular driving assistance system has been enabled for a threshold period of time.

8. The vehicular driving assistance system of claim 1, wherein the vehicular driving assistance system determines the steering angle offset based on a difference between a desired steering curvature of the vehicle and an actual steering curvature of the vehicle.

9. The vehicular driving assistance system of claim 1, wherein the vehicular driving assistance system maintains the first target lateral position of the vehicle within the first traffic lane using a feedforward control system.

10. The vehicular driving assistance system of claim 1, wherein, after applying the stored determined steering angle offset to maintain the second target lateral position of the vehicle within the second traffic lane, the vehicular driving assistance system determines an updated steering angle offset and stores the updated steering angle offset in the nonvolatile memory.

11. The vehicular driving assistance system of claim 1, wherein the vehicular driving assistance system, when determining the steering angle offset required to maintain the first target lateral position within the first traffic lane, filters differences between a desired steering curvature of the vehicle and an actual steering curvature of the vehicle that exceed a threshold value.

12. The vehicular driving assistance system of claim 1, wherein the steering angle offset represents a bias in steering of the vehicle from asymmetric tire alignment or steering column bias.

13. The vehicular driving assistance system of claim 1, wherein the vehicular driving assistance system determines the steering angle offset after completing execution of the first steering command.

14. A vehicular driving assistance system, the vehicular driving assistance system comprising:
a camera disposed at a vehicle equipped with the vehicular driving assistance system and viewing exterior of the vehicle, the camera capturing image data;
wherein the camera comprises a CMOS imaging array, and wherein the CMOS imaging array comprises at least one million photosensors arranged in rows and columns;
an electronic control unit (ECU) comprising electronic circuitry and associated software;
wherein the electronic circuitry of the ECU comprises an image processor for processing image data captured by the camera;
wherein the vehicular driving assistance system, via processing at the ECU of image data captured by the camera as the vehicle travels along a first traffic lane of a road, determines a first target lateral position of the vehicle within the first traffic lane;
wherein the vehicular driving assistance system, responsive to determining the first target lateral position for the vehicle within the first traffic lane, determines a first steering command to position the vehicle at the first target lateral position within the first traffic lane as the vehicle travels along the first traffic lane;

wherein the vehicular driving assistance system, before completing execution of the first steering command to maneuver the vehicle toward the first target lateral position, determines a steering angle offset that comprises an amount of error of the first steering command;

wherein the vehicular driving assistance system stores the determined steering angle offset in nonvolatile memory disposed at the vehicle;

wherein the vehicular driving assistance system, after storing the determined steering angle offset and when the vehicle is traveling along a second traffic lane during a subsequent trip, determines a second target lateral position for the vehicle within the second traffic lane;

wherein the vehicular driving assistance system, responsive to determining the second target lateral position for the vehicle within the second traffic lane, determines a second steering command to position the vehicle at the second target lateral position within the second traffic lane as the vehicle travels along the second traffic lane; and wherein the vehicular driving assistance system, responsive to determining the second target lateral position of the vehicle within the second traffic lane, applies the stored determined steering angle offset to the second steering command to position the vehicle at the second target lateral position within the second traffic lane as the vehicle travels along the second traffic lane.

15. The vehicular driving assistance system of claim 14, wherein the first traffic lane is different from the second traffic lane.

16. The vehicular driving assistance system of claim 14, wherein the second traffic lane is the same traffic lane as the first traffic lane, and wherein the vehicle travels along the second traffic lane during the subsequent trip after travelling along the first traffic lane.

17. The vehicular driving assistance system of claim 14, wherein the vehicular driving assistance system determines the steering angle offset based on a difference between a desired steering curvature of the vehicle and an actual steering curvature of the vehicle.

18. The vehicular driving assistance system of claim 14, wherein the vehicular driving assistance system maintains the first target lateral position of the vehicle within the first traffic lane using a feedforward control system.

19. A vehicular driving assistance system, the vehicular driving assistance system comprising:

a camera disposed at a vehicle equipped with the vehicular driving assistance system and viewing exterior of the vehicle, the camera capturing image data;

wherein the camera comprises a CMOS imaging array, and wherein the CMOS imaging array comprises at least one million photosensors arranged in rows and columns;

an electronic control unit (ECU) comprising electronic circuitry and associated software;

wherein the electronic circuitry of the ECU comprises an image processor for processing image data captured by the camera;

wherein the vehicular driving assistance system, via processing at the ECU of image data captured by the camera as the vehicle travels along a first traffic lane of a road, determines a first target lateral position of the vehicle within the first traffic lane;

wherein the vehicular driving assistance system, responsive to determining the first target lateral position for the vehicle within the first traffic lane, determines a first steering command to position the vehicle at the first target lateral position within the first traffic lane as the vehicle travels along the first traffic lane;

wherein the vehicular driving assistance system, after beginning execution of the first steering command to maneuver the vehicle toward the first target lateral position and when (i) a current speed of the vehicle exceeds a threshold speed and (ii) a current yaw rate of the vehicle is below a threshold yaw rate, determines a steering angle offset that comprises an amount of error of the first steering command;

wherein the vehicular driving assistance system stores the determined steering angle offset in nonvolatile memory disposed at the vehicle;

wherein the vehicular driving assistance system, after storing the determined steering angle offset and when the vehicle is traveling along a second traffic lane, determines a second target lateral position for the vehicle within the second traffic lane;

wherein the vehicular driving assistance system, responsive to determining the second target lateral position for the vehicle within the second traffic lane, determines a second steering command to position the vehicle at the second target lateral position within the second traffic lane as the vehicle travels along the second traffic lane; and wherein the vehicular driving assistance system, responsive to determining the second target lateral position of the vehicle within the second traffic lane, applies the stored determined steering angle offset to the second steering command to position the vehicle at the second target lateral position within the second traffic lane as the vehicle travels along the second traffic lane.

20. The vehicular driving assistance system of claim 19, wherein, after applying the stored determined steering angle offset to maintain the second target lateral position of the vehicle within the second traffic lane, the vehicular driving assistance system determines an updated steering angle offset and stores the updated steering angle offset in the nonvolatile memory.

21. The vehicular driving assistance system of claim 19, wherein the vehicular driving assistance system, when determining the steering angle offset required to maintain the first target lateral position within the first traffic lane, filters differences between a desired steering curvature of the vehicle and an actual steering curvature of the vehicle that exceed a threshold value.

22. The vehicular driving assistance system of claim 19, wherein the steering angle offset represents a bias in steering of the vehicle from asymmetric tire alignment or steering column bias.

* * * * *